Sept. 1, 1936.   N. A. PALMGREN   2,053,201
PLAIN BEARING
Filed Dec. 7, 1934
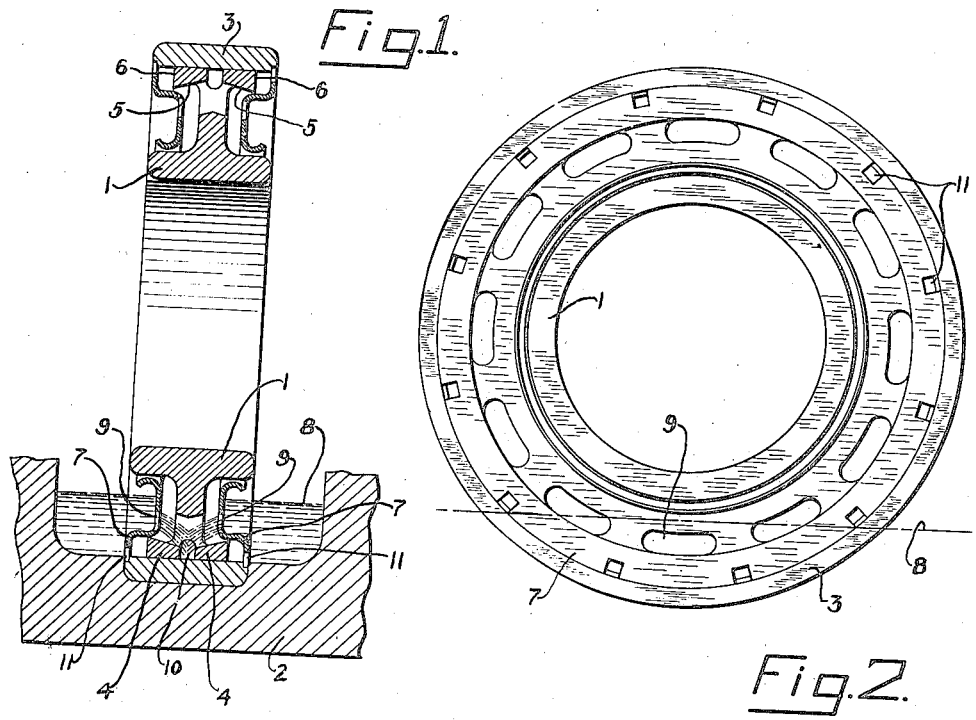
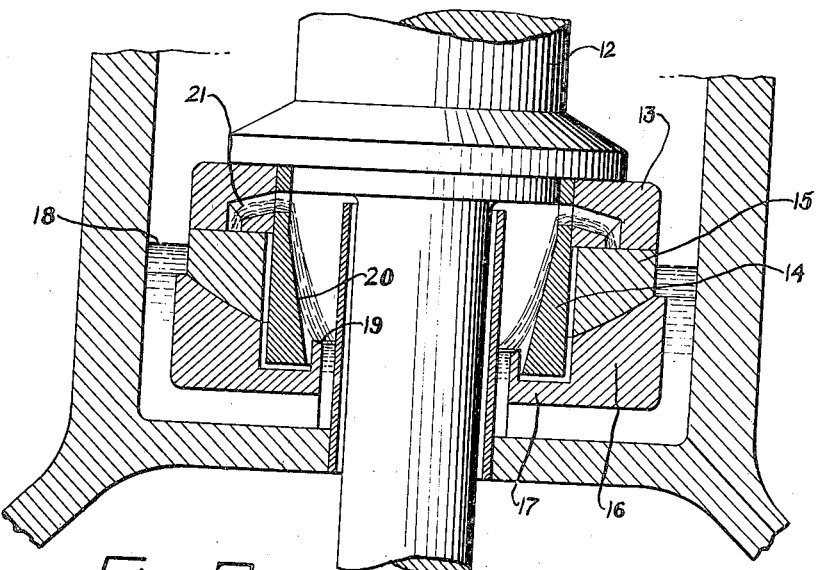
INVENTOR
Nils Arvid Palmgren
BY
ATTORNEY Patented Sept. 1, 1936

2,053,201

UNITED STATES PATENT OFFICE 2,053,201

PLAIN BEARING

Nils Arvid Palmgren, Goteborg, Sweden, assignor to Aktiebolaget Svenska Kullagerfabriken, Goteborg, Sweden, a corporation of Sweden Application December 7, 1934, Serial No. 756,542
In Sweden March 15, 1934

4 Claims. (Cl. 308—122)

The most effective lubrication of a plain bearing is obtained by supplying oil to the sliding surface through channels in the rotating part, whereby the oil is conducted to the said part at a point nearer to the axis of the shaft than the sliding surface. This is most conveniently done by introducing the oil through a hole in the center of the shaft, whence it can subsequently pass outwards through suitable channels. In most cases, however, this method is not practicable as the end of the shaft is inaccessible for connection to a conduit.

In plain bearings for mounting on a solid shaft and comprising an inner and outer bearing ring the oil must be introduced to a part of the inner ring which lies nearer to the axis of the shaft than the sliding surface. One manner of accomplishing this result which might be suggested is by providing the inner ring with a flange which is allowed to dip into an oil bath so that oil is transferred to the inner surface of the flange, whence it can subsequently be thrown out through channels onto the sliding surface. In practice it has however, been found that that part of the oil adjacent to the flange is caused to rotate so rapidly that the flow of oil to the flange is insufficient to bring more than the edge of the flange into contact with the oil. During the rotation of the bearing the oil cannot penetrate to the inner surface of the flange at the usual bearing speeds, and consequently no oil can reach the sliding surface through the channels.

The present invention has for its purpose to obviate this fundamental trouble. It can be applied to bearings with oil bath lubrication comprising a rotating and a non-rotating member or bearing ring with mating sliding surfaces and is characterized substantially by an axially extending flange connected to the rotating ring and having its inner surface facing the shaft on a smaller radius than the sliding surface, a lubricating channel from the aforementioned inner surface to the sliding surface and an annular member connected to the non-rotating ring embracing the edge of the flange for preventing the same from transmitting a rotary movement to the oil bath.

Through this arrangement the oil from the oil bath is seized by the inner surface of the flange and not by its edge and is then thrown out through the channels to the sliding surface.

The invention is illustrated in the accompanying drawing.

Figure 1 is a section in an axial plane through a radial bearing according to one embodiment of the invention. Figure 2 is a side view of the same bearing, and Figure 3 is a section in an axial plane of a thrust bearing according to another embodiment of the invention.

The inner ring 1 in Figure 1, is, in practice, mounted on a shaft. It bears with a cylindrical sliding surface against the outer ring 3 which is seated in the bearing housing 2. The inner ring 1 has an I-section and its two outer flanges 4 form the sliding surface of the inner ring. The inner surfaces 5 of the inner ring are tapered, having their smallest diameter at the edges 6 of the flanges. Annular plates 7 are provided at the outer ring 3 and are formed in such a manner that they embrace the flanges and prevent the edges of the same from transmitting their rotation to the oil bath. The annular plates 7 in this case embrace the edges of the flanges and part of their inner surface.

The oil is introduced from the oil bath 8 through the apertures 9, whereby it flows directly onto the inner surface 5 of the flanges. Through the tapered form of the flanges the oil is forced by centrifugal force toward the central plane of the bearing to the channel 10 which connects the inner surfaces 5 with the sliding surface. As soon as the oil comes into contact with the inner ring 1, it will be carried along in the rotation, but outside the plates 7 the oil bath remains stationary. This is essential in order to avoid the formation of foam in the oil bath and to prevent the oil from being thrown about in the bearing housing and leaking out through the seals.

The oil that has passed the sliding surface is then free to return to the oil bath through the comparatively narrow apertures 11.

In the form of the invention illustrated in Figure 3 a bearing ring 13 and an axially downwardly extending flange 14 are mounted on the shaft 12. The inner surface of the flange is tapered to such a degree that the oil is propelled upwards along the same during the rotation of the shaft. The bearing ring 13 bears with a plane sliding surface against the non-rotating ring 15 which is in its turn seated in the bearing housing 16. The flange 14 is embraced by an annular part 17 formed in the housing. The oil which stands at the level 18 outside the bearing is caught by the inner surface 20 of the flange 14 at the edge 19 of the annular part 17 and is caused to rotate and to follow the surface 20 upwards until it is brought to the sliding surface through the channel 21.

The invention can, however, be carried out in other ways. The annular part can thus cover the very edge of the flange against which it should bear without any considerable play.

Having thus described my invention, I claim and desire to secure by Letters Patent:

1. In a plain bearing, in combination; a rotating and non-rotating ring with mating sliding surfaces; an axially extending flange, connected to the rotating ring and having its inner surface facing the shaft on smaller radius than the sliding surface; the rotating ring being provided with a lubrication channel from the said inner surface to the sliding surface, a housing surrounding the said non-rotating ring, and an annular member, connected to said non-rotating ring and forming together with the housing a lubricant container, the said annular member being interposed between the body of the lubricant and the edge of the flange and embracing the edge and part of the inner surface of the flange and having an opening within the flange for admitting lubricant from the lubricant container to the lubricant channel.

2. Improvement according to claim 1, characterized thereby that the inner surface of the flange is tapered with the smallest diameter at the edge.

3. Improvement according to claim 1, characterized thereby that the annular member embraces the edge of the flange and part of the inner surface of the flange.

4. In a plain bearing, in combination: a chamber of lubricant, a stationary outer bearing ring located within such chamber and having an internal sliding surface, a rotatable inner bearing ring having an external sliding surface mating with the sliding surface of the outer ring, the inner ring having an annular axially extending flange at its outer periphery, there being lubricant channels extending from the inner surface of the flange to the sliding surface of the bearing, annular plates in engagement with the outer bearing ring, portions of the said plates being offset axially inwardly within the flange of the inner ring and lubricant openings in the offset portions of the annular plates for admitting lubricant to the internal surface of the flange of the inner bearing ring.

NILS ARVID PALMGREN.